(12) United States Patent
Moireau et al.

(10) Patent No.: US 6,884,469 B1
(45) Date of Patent: Apr. 26, 2005

(54) METHOD FOR MAKING YARN AND PRODUCTS COMPRISING SAME

(75) Inventors: Patrick Moireau, Curienne (FR); Bruno Gibello, Chambéry (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 109 days.

(21) Appl. No.: 10/149,633

(22) PCT Filed: Aug. 24, 2000

(86) PCT No.: PCT/FR00/02364

§ 371 (c)(1),
(2), (4) Date: Jun. 12, 2002

(87) PCT Pub. No.: WO01/17923

PCT Pub. Date: Mar. 15, 2001

(30) Foreign Application Priority Data

Sep. 3, 1999 (FR) .............................................. 99 11046

(51) Int. Cl.[7] .............................. B05D 1/28; C23C 20/22
(52) U.S. Cl. .............................. 427/428.1; 427/428.05; 427/428.18; 427/429
(58) Field of Search ....................... 427/428.01, 428.05, 427/428.09, 428.18, 428.19, 428, 429; 428/378, 392; 65/432, 443, 447

(56) References Cited

U.S. PATENT DOCUMENTS 3,853,605 A  12/1974  Fahey ..................... 117/126 GB
5,352,392 A  10/1994  Johnson et al. ................ 264/22
5,454,846 A  10/1995  Roncato et al. ................ 65/381
5,611,836 A   3/1997  Moireau ....................... 65/453
6,316,058 B1 11/2001  Moireau et al. ............ 427/428
6,322,888 B1 11/2001  Moireau et al. ............ 428/378

FOREIGN PATENT DOCUMENTS

| EP | 0 570 283 A1 | 11/1993 |
| EP | 0 599 695 A1 | 6/1994 |
| FR | 1 161 659 | 9/1958 |
| FR | 2 713 625 | 6/1995 |
| FR | 2 743 361 | 7/1997 |
| FR | 2 767 539 | 2/1999 |
| FR | 2 763 328 | 11/2001 |
| GB | 668319 | 3/1952 |
| GB | 1 273 377 | 5/1972 |
| WO | WO 92/05122 | 4/1992 |

Primary Examiner—Rena Dye
Assistant Examiner—J. M. Gray
(74) Attorney, Agent, or Firm—Oblon, Spivak, McClelland, Maier & Neustadt, P.C.

(57) ABSTRACT

The invention relates to a process for manufacturing a continuous yarn, and the product obtained from such process. A multiplicity of continuous filaments are formed by the mechanical drawing of a multiplicity of streams of molten thermoplastic(s) flowing from the orifices of at least one fiberizing device. A mixture, in the liquid state, is deposited on the surface of at least some of the filaments before they are brought together into at least one yarn. An absorbent mat may be continuously impregnated, with at least some of said mixture being continuously taken up by means of a rotating roller in contact with said mat, and using a sizing roller, said mixture may be deposited on the filaments while they are being drawn.

31 Claims, 2 Drawing Sheets

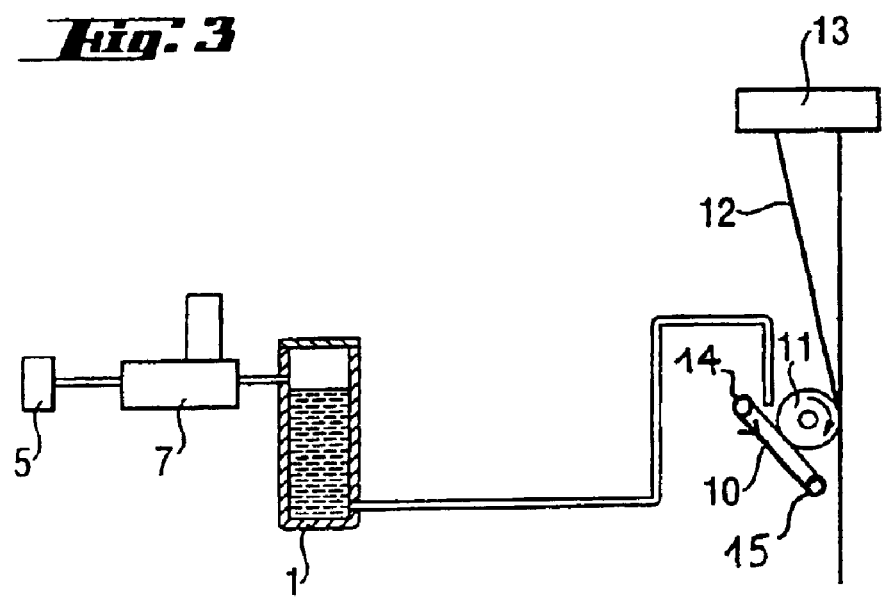

METHOD FOR MAKING YARN AND PRODUCTS COMPRISING SAME

FIELD OF THE INVENTION

The present invention relates to the field of reinforcing fibers and of composites and, in particular, to the deposition of size compositions on glass filaments (or yarns).

BACKGROUND OF THE INVENTION

The manufacture of reinforcing glass yarns is carried out, in a known way, starting from streams of molten glass flowing out of the orifices of bushings. These streams are drawn in the form of continuous filaments, and these filaments are then brought together into base yarns, which are then collected.

Before they are brought together into the form of yarns, the filaments are coated with a size by passing over a sizer. This deposition is necessary for obtaining the yarns and allows them to be combined with other organic and/or inorganic materials in order to produce composites.

The size firstly acts as a lubricant and protects the yarns from the abrasion that results from high-speed friction between the yarns and various devices during the aforementioned process.

The size may also, especially after it has cured, provide the aforementioned yarns with integrity, i.e. the mutual bonding of the filaments within the yarns. This integrity is especially desired in textile applications in which the yarns are subjected to high mechanical stresses. This is because, if the filaments are poorly held together, they break more easily and disrupt the operation of the textile machinery. What is more, nonintegrated yarns are considered to be difficult to handle.

However, the size is also employed in cases in which this integrity is not desired, such as in the case of reinforcing fibers, when a high rate of impregnation with the material to be reinforced is desired. Thus, in the manufacture, for example, of pipes using direct impregnation and filament winding techniques, open yarns in which the filaments are separated from one another are used. Small quantities of size, especially less than 0.5% by weight, are then used.

The size also facilitates the wetting and/or impregnation of the yarns by the materials to be reinforced and helps to create bonds between said yarns and said materials. The mechanical properties of the composites obtained from the material and from the yarns depend in particular on the quality of the adhesion of the material to said yarns and on the ability of said yarns to be wetted and/or impregnated by said material.

Most sizes currently used are aqueous sizes which are simple to handle but which must be deposited in large quantities on the filaments in order for them to be effective. Water generally represents more than 90% by weight of these sizes (especially for viscosity reasons), and this means that the yarns have to be dried before they are used, it being possible for water to impair the good adhesion between the yarns and the materials to be reinforced. These drying operations are lengthy and expensive and their effectiveness is not always optimal; they require the use of large-capacity ovens. In addition, when they are carried out during the fiber-forming operation (that is to say before the yarns obtained by converging the filaments have been collected), either on filaments (WO 92/05122) or on yarns (U.S. Pat. No. 3,853,605), they require the installation of dryers under each bushing and, when they are carried out on yarn packages, they run the risk of causing irregular and/or selective migration of the components of the size within the packages (aqueous sizes already have a tendency to be distributed over the yarns in an irregular manner because of their nature) and possibly of causing yarn-coloration or package-distortion phenomena. Moreover, without drying, package distortion is often observed on straight-sided packages (rovings) of fine yarns (i.e. yarns having a "count" or "linear density" of 300–600 tex (g/km) or less) which are coated with aqueous sizes.

It is to remedy these drawbacks that a novel type of size, which is virtually free of solvents and called an anhydrous size, has been developed. Anhydrous sizes are curable and/or crosslinkable solutions which optionally contain organic solvents and/or water in small amounts, generally of less than 5% by weight. They are distinguished advantageously from aqueous sizes by their ability to be distributed in a homogeneous and uniform manner on the surface of the filaments, i.e. forming films of constant thickness, and by the fact that they make any subsequent drying or solvent-removal treatment unnecessary since the small quantities of solvent evaporate during deposition of the size on the filaments and during curing of the size.

Furthermore, the quantities of anhydrous size deposited on the filaments are 30' much less than those of aqueous size; thus, when depositing by means of a sizing roller, a film is formed on the surface of the latter with a thickness not exceeding 15 $\mu$m in the case of an anhydrous size instead of a film with a thickness of approximately 90 $\mu$m in the case of an aqueous size. Moreover, these small quantities of anhydrous size are deposited on the filaments with a much higher efficiency, possibly reaching 100% when the operating conditions are chosen judiciously, whereas this efficiency is generally about 40 to 75% with aqueous sizes.

Anhydrous sizes fall mainly into three categories.

The first category encompasses UV-curable sizes as described in patent EP 0 570 283 and comprising, for example:

at least one mono-unsaturated or polyunsaturated monomer and/or oligomer of the polyester acrylate, epoxy acrylate, silicone compound or urethane acrylate type;

at least one photoinitiator, such as benzoin, acetophenone, benzophenone, sulphonylacetophenone and their derivatives, as well as thioxanthones;

if necessary, at least one organic solvent; and, optionally, additives such as at least a wetting agent, an adhesion promoter, an antishrinkage agent, a compatibilizer consisting especially of a silane.

The second family of anhydrous sizes is that of thermally curable and/or crosslinkable sizes, as described in patent applications FR 2 713 625 and 2 743 361.

By way of example, the basic system of these compositions comprises:

an acrylic component and a heat-activated radical-initiating peroxide; or an epoxy component and an anhydrous constituent which cure by reacting with each other.

The third category of anhydrous sizes forms part of the teaching of applicant FR 97/05926: these are room-temperature curable sizes, the basic systems of which may contain one or more homopolymerizable monomers and/or at least two copolymerizable monomers which require no external supply of energy. In the case of copolymerization of two monomers, these may be deposited on the filaments in the form of their mixture in solution, immediately after this mixture has been formed, or in the form of a first stable solution containing a first monomer mixture and of a second stable solution containing a second monomer mixture. In the latter variant, the first solution is applied to the filaments and the second is applied subsequently thereto, at the latest while the filaments are being combined into yarns. Be that as it may, the copolymerization generally starts on the filaments as soon as the first and second monomers come into contact with each other and, if necessary, with the required catalyst or catalysts.

The UV-radiation treatments and heat treatments required to cure the sizes of the two first types mentioned above are carried out in one step or in several steps, after the filaments have been brought together into yarns. Thus, depending on the envisaged use and on the nature of the yarns, an irradiation or heat pretreatment is sometimes carried out at the time of collecting the yarns in various forms of packages, in order to precure the size, the actual curing of which is carried out in a subsequent radiation or heat treatment when the yarn is unwound for the specific application for which it is intended, namely a textile application or an application of reinforcing organic or inorganic materials. This is because the yarn coated with the as yet uncured composition does not exhibit integrity in the ordinary sense of the term since the sheathed filaments of which the yarn is composed may slip over each other. This yarn can therefore be handled easily and, when it is wound in the form of packages, can be easily extracted from the packages without first having to undergo a treatment to cure the size. The yarn coated with the as yet uncured size composition has, moreover, a very high capability of being wetted and impregnated by materials to be reinforced, it thus being possible for impregnation to take place more rapidly (increase in productivity) and the composites obtained thus having a more homogeneous appearance and having certain of their mechanical properties improved.

However, as described in patent EP-0 570 283, curing the size by the UV irradiation of a yarn in the form of a package may also have advantages.

With regard to depositing anhydrous sizes on glass filaments, several techniques are known. Thus, according to application FR 2 763 328 already mentioned, this deposition is carried out with the aid of a roller or of a sprayer, with the aid of a device which also acts as a converging means, or by the use of other yarns or filaments coated with the composition and brought into contact with the glass filaments. The latter technique makes reference to the special case of producing composite yarns, consisting of comingled glass filaments and thermoplastic polymer filaments or yarns.

By definition, deposition by spraying is inevitably accompanied by quite a significant amount of loss of size; the recovery of this lost proportion, assuming that it is possible, constitutes a handicap.

The method of deposition by means of a roller or of a device for converging the filaments into yarns consists of taking up size from a somewhat viscous and thick liquid film formed on a smooth surface, having ranges of physical properties, especially surface hardness and surface microporosity, of the type of those of metal surfaces. Starting from the observation that the chemical nature of the anhydrous sizes allows them to be used in ever lower quantities, there is currently a requirement for a process for forming an ever thinner liquid film, of perfectly uniform, controllable and reproducible thickness, on a macroscopically smooth surface of the metallic, ceramic or organic type. This is because it may be expected that the take-up of size onto the filaments from such a film results in the filaments being coated with a minimum quantity of size, with an increased deposition efficiency, i.e. a reduction in the amount of size lost, and for this to be achieved under completely controlled conditions. Finally, the aim is, of course, to obtain filaments and yarns, and reinforced materials containing them, which have sufficient, or at least preserved, mechanical properties or even in certain respects novel mechanical properties.

Currently, there is no process making it possible to form, in a controllable manner, a thin film of anhydrous size at the surface, for example, of a metal roller. This is because the immersion of the lower part of the roller in the size solution coupled with the rotation of the roller results in the formation, at the surface of the roller, of a layer whose characteristics can be controlled only to a small extent by varying the viscosity of the solution and the rate of rotation of the roller. The thickness of this layer is too great and irregular, and it is impossible to avoid loss of size, in the device for bringing the filaments together into yarns or for collecting the yarns, by the size being thrown off under the effect of the inherent centrifugal force at the high winding rates employed.

Moreover, no system for depositing size on a sizing roller with the aid of a metering pump and of an injection nozzle has yet allowed the formation of the desired film.

Furthermore, the previously-mentioned patent EP 0 570 283 briefly mentions, in its part describing FIG. 1, a coating device 13 consisting of an applicator provided with a felt moistened with a reactive mixture using a metering pump. This is because the structure of a felt allows it to soak up a solution in a particularly homogeneous manner. However, the take-up of size suggested by the European patent, from the felt onto the glass filaments, is not satisfactory in the context of the technical problem mentioned above since the deposition of the required small quantities of size on the filaments could not be achieved except at the cost of the felt drying out somewhat, a situation which, given the naturally irregular structure of the felt, the surface of which has fibers of varied dimensions, directions or even textures, would run the risk of the glass filaments catching thereon and therefore the risk of said filaments breaking. Only relatively large amounts of size can thus be deposited in the manner described in the document.

According to an advantageous approach, application FR 2 767 539 proposes, in a process for manufacturing a continuous yarn, which consists in forming a multiplicity of continuous filaments by the mechanical drawing of a multiplicity of streams of molten thermoplastic(s) (particularly molten glass), in depositing a mixture, in the liquid state, in particular an anhydrous size, on the surface of the filaments before they are brought together into at least one yarn, according to the following technique. A mat of mechanically held-together fibers, of the felt or woven fabric type, is continuously impregnated with the liquid mixture, at least some of which is continuously taken up by means of a rotating roller in contact with the mat; it is by using this sizing roller that the mixture is deposited on the filaments while they are being drawn. The material of the sizing roller is of course selected so as to withstand the abrasion due to the rubbing of the filaments. This technique makes it possible to deposit on the surface of the filaments quantities of size as low as 0.5 to 1% by weight with respect to the weight of the filaments, which quantities are sufficient in the case especially of currently known high-performance anhydrous sizes, with a deposition efficiency close to or equal to 100%. A liquid film of anhydrous size with a constant thickness of less than 8 μm may be formed on the surface of the sizing roller in a perfectly reproducible and controllable manner. Since the loss of size is reduced practically to nothing, a sizing rate as low as 160 to 350 g/h will be sufficient for a bushing producing 800 kg of filaments per day.

Moreover, the French patent application discloses that the mat is positioned in an inclined plane and is fed with size drop by drop flowing onto the upper part of the mat, so that the size diffuses over the entire surface of the mat both under gravity and by a capillary effect. Furthermore, it should be pointed out that in the industrial implementation of this technique the dimensions of the sizing roller and of the mat are necessarily greater than the surface area of all of the filaments to be sized, as the latter are frequently subjected to lateral displacements, and it is necessary, of course, to ensure that all of the filaments are at any moment in contact with the sizing roller, which itself has to be provided with a uniform film of size over the entire part of its surface in contact with the filaments. However, it is not possible to prevent the lateral end regions of the sizing roller from hardly or even never coming into contact with filaments, since these regions are largely dimensioned in order to guarantee that the mixture is deposited on all the filaments. One of the consequences of this is the presence of a relatively stagnant mixture, both in these lateral end regions of the sizing roller and in the corresponding regions of the mat. It has also been observed that in these regions the liquid mixture may, depending on the type of size, undergo a reaction owing to the action of external elements such as water, carbon dioxide and high temperature, forming condensates or gels, this type of chemical reaction moreover having a tendency to propagate toward the center of the mat and of the sizing roller, including in the regions of the latter which actually participate in transferring the mixture onto the filaments. This phenomenon causes drying regions on the surface of the roller. This insufficient presence of size results in imperfect protection of the filaments, which is manifested by the formation of fuzz or the breakage of filaments in the sheet.

SUMMARY OF THE INVENTION

The present invention relates to a process for manufacturing a continuous yarn, which consists in forming a multiplicity of continuous filaments by the mechanical drawing of a multiplicity of streams of molten thermoplastic(s) flowing out of the orifices of at least one fiberizing device and which consists in depositing a mixture, in the liquid state, on the surface of at least some of the filaments before they are brought together into at least one yarn, and in which process:

an absorbent mat is continuously impregnated with the mixture in the liquid state;

at least some of said mixture is continuously taken up by means of a rotating roller in contact with said mat; and using the sizing roller, said mixture is deposited on the filaments while they are being drawn.

The invention resides particularly in the fact that the mat is driven in rotation about an axis parallel to that of the sizing roller.

This is because it has been found that such an arrangement naturally causes the liquid mixture to flow from the lateral end regions of the mat and of the sizing roller toward their central regions, preventing stagnation of the mixture and formation of gel which ensues in these lateral regions. Thus, a means is available which guarantees that the lateral regions of the sizing roller and of the mat are permanently provided with fresh liquid mixture, in such a way that the residence time of the size in the felt before being replenished is short enough for the various chemical reactions associated with the external conditions to result in insignificant deterioration in the quality of transfer of the size onto the roller. While solving the problem of gel formation, the process of the invention retains the qualities inherent in the pick-up of mixture by the roller of the type by contact with an impregnated mat, these abovementioned qualities being: homogeneity, fineness and uniformity of thickness of the skin of mixture on the roller and, finally, maximum efficiency and quality of deposition.

Preferably, the absorbent mat is:

either a mat of fibers held together mechanically, such as a felt or a woven;

or one consisting of a compressible elastomeric spongy material, especially a foam based on a polymer such as polyurethane, poly(tetrafluoroethylene), polybutadiene, etc., possibly reinforced, for example by a mesh of glass fibers.

In all cases, the mat must be inert to the sizing components, both from the chemical standpoint (destruction of polymeric chains, etc.) and the mechanical standpoint (swelling, abrasion resistance, etc.).

When an elastomeric spongy material is employed, it preferably has a high enough density, with pore diameters of less than 200 micrometers distributed relatively homogeneously, with a compressibility of 3 to 10 times its volume. In particular, it is in the form of sleeves or bands generally reinforced with a mesh of polymer (polyamide, polypropylene, polyethylene etc.) fibers, glass fibers, natural cellulose fibers, etc., so as to eliminate the elongatability without impairing the compressibility.

According to the most common method of implementation, all the filaments constituting the yarn are made of glass. However, the invention does not exclude the variant in which the yarn consists of glass filaments and of organic filaments, only the glass filaments being provided with a coating of said mixture in the liquid state or, on the contrary, the organic filaments also being provided with this coating, or with a coating of a different size, the various size compositions being especially capable of reacting with one another. Organic filaments should be understood to mean thermoplastic polymer filaments, such as polypropylene, polyamide or polyester filaments. These polymer filaments may be sprayed between the already-sized glass filaments, before all these filaments are brought together into a yarn, as described in patent EP 0 599 695.

Given the abovementioned properties of the anhydrous sizes, as well as their excellent capability of wetting the filaments, it is understandable that the liquid mixture to be deposited on the filaments preferably consists of such an anhydrous size, for the definition of which reference is made to the contents of patent EP 0 570 283 and of applications FR 2 713 625, 2 743 361 and 2 763 328 which have already been mentioned.

According to other features o: the process of the invention, mentioned in increasing order of preference:

the surface of the mat and the surface of the sizing roller are made to undergo translational movements of the same direction along their line of contact;

in the same sense; and in the latter case, the speed of translation of the surface of the mat is from 0.5 to 50% of that of the translation of the surface of the sizing roller. This arrangement is advantageous, in particular should one or more filaments break; this is because the filaments then have a tendency to adhere to the sizing roller, but are pushed back into the line of contact of the sizing roller with the mat because of the speed of translation of the surface of the mat, which is less than that of the roller. When on the contrary the speed of translation of the surface of the mat is greater than that of the roller, any broken filaments are likely to be entrained between the mat and the roller, considerably complicating the procedures for restoring continuous yarn manufacturing operations.

According to another embodiment, the surface of the mat and the surface of the sizing roller are made to undergo translational movements along their line of contact in the same direction but in opposite senses. The speed of translation of the surface of the mat is then preferably less than 20% of that of the surface of the sizing roller. This is because the mixture in the liquid state firstly diffuses into the thickness of the mat and is then taken up by the sizing roller by capillary effect. It has been observed that, with too high a speed of the mat, this process does not proceed sufficiently uniformly since the time separating the moment when the mixture in the liquid state comes into contact with a point on the mat and the time when this point comes into contact with the sizing roller becomes too short. As a result, the liquid film formed on the sizing roller is nonuniform.

Furthermore, a double or multiple application of the process of the invention to the filaments while they are being drawn, before they are brought together into yarn(s), for the purpose of transferring thereto liquid compositions capable of reacting with one another especially at ambient temperature by the copolymerization of constituents belonging to such separate compositions, also forms part of the invention. In other words, the overall dimensions of the device necessary for implementing the process of the invention in no way prevents two or more of them being combined in order to deposit a double coating or a multiple coating on a single set of filaments, as described in application FR 2 763 328.

In the case of such a double or multiple application, it is moreover possible, without departing from the scope of the invention, to apply one or more coatings of mixture by means of devices other than that described above, provided that the first of the coatings is applied by means of the mat and the sizing roller of the invention: this is because, to obtain a size coating of good quality on the filaments, that is to say one which is homogeneous and of controllable and uniform thickness, it is the quality of the coating of the first sizing component which is the most key, as is well known in the field in question. The excellence of the manner of deposition according to the invention is such that it allows the use, for applying the second size coating and/or a subsequent coating, of devices which are relatively unsophisticated but nevertheless capable of producing a size coating of very high final quality. This device may consist, for example, of a gathering wheel and stationary return, equipped, in the bottom of its groove, with a channel for the inflow of mixture intended for the second coating or for a subsequent coating; it ensures that the filaments coated beforehand with at least a first mixture do come into contact with the subsequent mixture, simultaneously with the gathering of the filaments into a yarn and possibly the return, that is to say the change in direction of the latter.

The yarns obtained by the process of the invention are generally collected in the form of packages on rotating supports. The yarns obtained according to the invention can be easily unwound from the packages and can be easily handled.

The yarns may also be collected on receiving supports undergoing translational motion. They may in fact be thrown by a device, which also serves to draw them, onto the collecting surface which is moving transversely to the direction of the sprayed filaments, for the purpose of obtaining a web of intermingled continuous yarns, called a "mat". The yarns may also be chopped before collecting by a device serving also to draw them.

The yarns obtained according to the invention may thus be in various forms after collection, especially in the form of reels of continuous filaments (rovings, cakes, cops, etc.), or in the form of chopped yarns, and may be brought together into the form of braids, tapes, mats or networks, these being in woven or nonwoven form, etc. The glass filaments forming these yarns may have a diameter of between 5 and 30 microns and the glass used for producing these filaments may especially be E glass, AR (alkali-resistant) C glass, R glass, Z glass, S glass, D glass, etc.

The yarns obtained by the invention may be advantageously combined with various materials to be reinforced for the purpose of producing composite components which have good mechanical properties. The composites are advantageously obtained by combining at least one of the glass yarns according to the invention with at least one organic and/or inorganic material, the glass content of these composites generally being between 20 and 80% by weight.

Consequently, the subject of the invention is also a product consisting, at least in part, of a yarn obtained by a process as described above. This yarn may or may not have been subjected to a subsequent chopping or weaving treatment, to mechanical spraying or to any other shaping process; optionally, it is mixed with an organic or inorganic material in order to reinforce the latter.

This yarn has a low loss on ignition of at most 3% by weight and even, in many embodiments, at most equal to 1% by weight.

BRIEF DESCRIPTION OF THE DRAWINGS

Other features and advantages of the invention will appear in light of the following description of the appended drawings in which:

FIG. 3 shows a diagrammatic representation of a third device for implementing the process of the present invention.

DETAILED DESCRIPTION OF THE INVENTION

The devices of the present invention comprise a tank 1 of size optionally maintained at a constant temperature, ensuring that the product is well preserved, so as to guarantee that the metering conditions remain stable.

Figure 1:
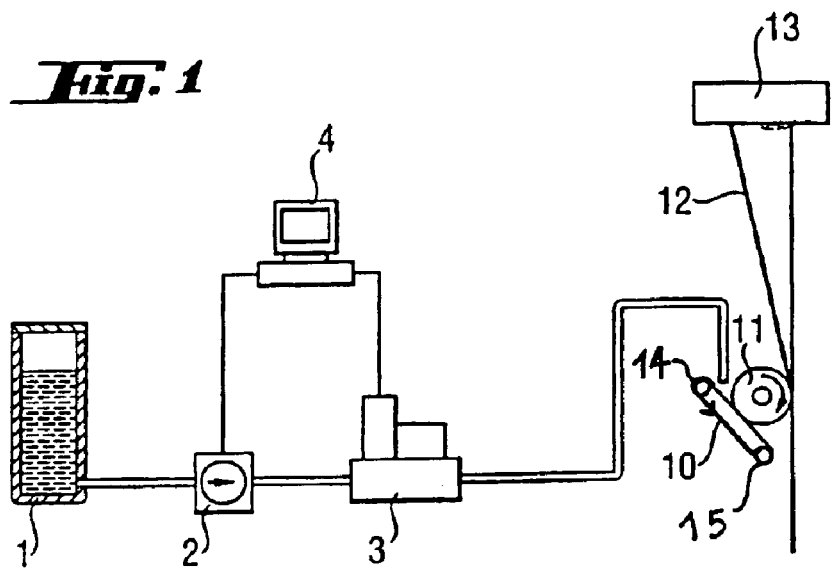
FIG. 1 shows a diagrammatic representation of a first device for implementing the process of the present invention.

According to FIG. 1, the size is drawn up by a pump 2 of the peristaltic or diaphragm type, which subjects the fluids to particularly low shear stresses.

The quantity drawn up is transferred onto the distributing felt 10 after having passed through a flow meter 3.

In addition, a microcomputer 4 is connected both to the flow meter 3 and to the pump 2 so as permanently to adapt the volume or the mass of size delivered by the pump 2 depending on the information supplied by the flow meter.

Figure 2:
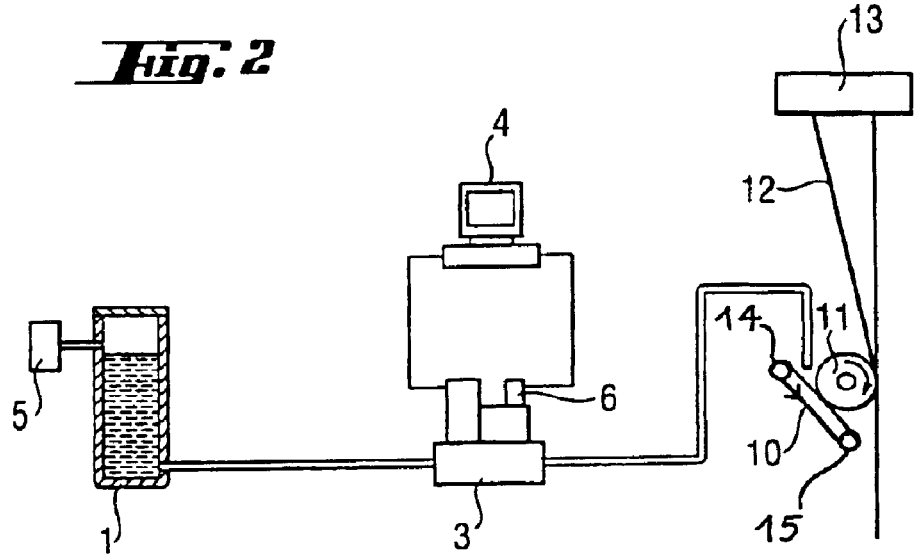
FIG. 2 shows a diagrammatic representation of a second device for implementing the process of the present invention.

The devices shown in FIGS. 2 and 3 employ, for feeding the felt 10, a compressed-air supply 5 at the start of the fluid circuit upstream of the tank 1.

According to FIG. 2, the size coming from the tank 1 passes through a flow meter 3 and a regulating valve 6, both of these being connected to a microcomputer 4. This time, the microcomputer 4 uses the information delivered by the flow meter 3 to control, in real time, any correction to the flow rate by means of the regulating valve 6.

This regulating function is provided, in the simplified device shown in FIG. 3, by a temperature-compensating volumetric regulating valve 7 inserted in the fluid circuit between the pressurized-air supply 5 and the tank 1. The valve 7, having an integrated and autonomous regulating function, makes it unnecessary to use an auxiliary management and control device of the computer type.

The felt 10 is a continuous band driven in rotation around two rollers 14 and 15 of parallel axes. Another recommended variant consists in replacing, for driving the continuous band, the two rollers 14 and 15 in the figure with a single roller parallel to the latter and positioned so as to ensure that the felt 10 is in contact with the sizing roller 11.

The felt 10, uniformly fed with size, has the function of distributing the latter over a portion of the surface of the sizing roller 11 which is slightly larger than that with which the web of filaments 12, delivered by the bushing 13 and being drawn, is in contact. The sizing roller 11 has an axis parallel to those of the rollers 14 and 15 driving the felt 10.

The sizing roller 11 is driven in rotation in the direction corresponding to the direction in which the filaments are drawn, and at a peripheral linear speed of 50 to 150 n/min (to be compared with the run speed of the filaments: 600 to 4000 m/min)

The position of the rollers 14 and 15 can be adjusted, thereby making it possible to vary the inclination of the assembly which they form with the felt 10, and the pressure exerted by this assembly on the sizing roller 11.

The felt 10 is driven in the direction corresponding to that of the rotation of the sizing roller 11, and at a linear speed of 0.10 to 75 m/min.

The flow of the size and its distribution in the felt 10 depend on the viscosity of the size, on the characteristics of the felt (nature of the constituents, density, texture, dimensions), on the pressure that it exerts on the sizing roller and on the movement characteristics of the felt and of the sizing roller.

The texture of the felt and the viscosity of the size are intimately connected. For example, a dense felt will be wetted on the surface by a viscous size whereas a liquid size will easily penetrate a not very dense felt and will flow out of it without being distributed over its entire width.

The inclination of the felt also plays an important role in distributing the size by allowing the gravitational forces to have a greater or lesser effect. This makes it possible to adjust the operation and to compensate for any shortcomings in the distribution which are due to a not entirely suitable felt.

The optimum correspondence between the viscosity of the size and the density of the felt is indicated in the table below in the case of a 30° inclination of the felt with respect to the horizontal, a flow length of 6 cm, a distribution width of 6 cm and a cylinder pressure on the coating device of 1 bar:

| Viscosity of the size at 20° C. (cP) | Density of the felt (g/dm$^3$) |
|---|---|
| <20 | 200–400 |
| 20–50 | 150–250 |
| 50–100 | 125–175 |
| 100–250 | 100–150 |
| 250–400 | <100 |

The nature of the felt has an effect on the quality with which the size is distributed in respect of three criteria associated with the type of fiber employed: the chemical nature of the fibers, their diameter and their homogeneity.

The great majority of the fibers making up the felts are composed of cellulose fibers or wool fibers. Synthetic fibers are also starting to be used, such as polypropylene fibers or polyester fibers.

In the case of size compositions whose constituents are not very polar, polypropylene-type synthetic felts are very suitable and the chemical compatibility is satisfactory. In the case of compositions having a marked polar character (which is the case with many constituent components in sizes), natural felts, of the wool type (which is more hydrophilic), are preferred.

The chemical compatibility of the various materials of the felts may be modified in one direction or another by a suitable chemical treatment of the fibers. However, the interactions with the components of the size (which, because of their monomeric character, are very good solvents) become difficult to control. In most cases, untreated fibers are preferred.

In general, the diameter of the fibers must be as homogeneous as possible in order to make it easier to transfer the size onto the roller. Any heterogeneity in the fibers, in particular the presence of coarse fibers, causes localized differences in thickness of the film of size on the surface of the sizing roller, but these are nevertheless liable to cause drying-induced breakages at the roller. Fibers of small diameter (generally 20 microns) are preferred. In addition, the fibers must be long enough, flexible enough and sufficiently entangled as to avoid any entrainment of entire fibers or breaks at the surface of the roller.

The presence of foreign elements at the surface of the roller generally causes breakages whose origin is difficult to determine.

In normal operation, more than 95% of the size is transferred onto the sizing roller. To achieve such a performance, it is possible to vary different parameters.

In the first place, the pressure exerted by the felt on the roller leads to the formation of compressed area within the felt through which the flow is very greatly reduced.

However, the pressure must not be too high so as not to damage the roller or the drive mechanisms.

The rotating roller takes up the size available, the latter being sufficiently compatible with the material of the roller not to cause the phenomenon of dewetting. In addition, the quantity of size is always much less than the roller is capable of taking up.

By way of example, in the case of a 40 mm diameter graphite roller having a felt/roller contact length of 80 mm, the pressure that needs to be exerted is, in most cases, between 0.2 and 2 bar.

Secondly, the speed of rotation of the roller has a certain effect on felt/roller transfer in a few special cases. Thus, when the size has a low viscosity and the surface of the roller is very effectively wetted thereby (generally, in the case of weakly polar sizes) and/or when the final product requires a high loss on ignition, i.e. a large quantity of size, it is useful to increase the speed of rotation of the sizing roller in order to increase the take-up area to be wetted and finally to increase the quantity of size transferred. When a 40 mm diameter graphite roller is used, the rate of rotation of the roller may be varied between 50 and 150 rpm in order to be satisfactory in most cases.

The third and final parameter to be taken into consideration in the quality of felt/roller transfer is that of the chemical nature and of the surface finish of the roller. Moreover, this parameter is incidentally even more significant in respect of the quality of roller/fiber transfer.

Given that the felt/roller and roller/glass-fiber transfer characteristics are intimately related, the best material is currently graphite or derivatives thereof.

As regards the lateral end regions of the sizing roller 11, which rarely, or never, come into contact with the filaments 12, and the corresponding regions of the felt 10, it has been found that, despite the absence of size take-up by the filaments in these regions, the size therein is maintained in the liquid state, not undergoing any condensation reaction nor any transformation into a more or less solid state. The observation makes it possible to ascribe this phenomenon to the presence, within the felt 10, of a flow of size from its lateral regions toward its center, that is to say toward a region in contact with the filaments, and hence a region in which the size is picked up by the latter. This flow is due to the movement that the felt 10 is made to undergo according to the invention.

The invention therefore completely solves the gelling problem described above.

In normal operation, the technique of depositing anhydrous sizes, as described above, allows a deposition efficiency of very close to or equal to 100% to be achieved. With aqueous sizes, this efficiency is generally about 40 to 75%. Given that the cost of the raw materials (in terms of dry matter) are substantially equivalent, the economic advantage of anhydrous sizes deposited using this method is obvious.

In addition, from the environmental standpoint, it is advantageous to eliminate one source of waste which is potentially polluting and gives rise to additional costs in order to destroy the effluents generated.

Should effluent be produced (generally in very small quantity) during cleaning, testing or operating under special conditions, and given that all of the waste is of an organic nature, this waste may be easily destroyed by incineration in suitable plants.

What is claimed is:

1. A process for manufacturing a continuous yarn from a plurality of continuous filaments formed by the mechanical drawing of a plurality of streams of material flowing from orifices of at least one fiberizing device, the process comprising:
   continuously impregnating an absorbent mat with a liquid;
   continuously transferring at least a portion of the liquid to a rotating roller in contact with the mat;
   using the roller, depositing the liquid on the surface of at least one of the filaments before the filaments are brought together into at least one yarn;
   wherein the mat and roller rotate about substantially parallel axes.

2. The process of claim 1, wherein the absorbent mat is formed of fibers that are mechanically held together.

3. The process of claim 1, wherein the absorbent mat is formed of felt or a woven material.

4. The process of claim 1, wherein the absorbent mat is formed of an elastomeric spongy material.

5. The process of claim 4, wherein the absorbent mat is formed of a foam.

6. The process of claim 5, wherein the foam is formed from polyurethane or poly(tetrafluroethylene).

7. The process of claim 4, wherein the elastomeric spongy material is reinforced.

8. The process of claim 1, wherein the filaments are formed from at least one of polymer and glass.

9. The process of claim 1, wherein the liquid is an anhydrous size or an anhydrous size component.

10. The process of claim 1, wherein the mat and the roller have surfaces that are driven in translational movements in substantially the same direction along a line of contact of the surfaces.

11. The process of claim 10, wherein the surface of the mat and the surface of the roller are driven in translational movements in the same sense along the line of contact.

12. The process of claim 11, wherein the speed of the translational movement of the surface of the mat is from about 0.5% to about 50% of that of the translational movement of the surface of the roller.

13. The process of claim 10, wherein the surfaces of the mat and roller are driven in translational movements in opposite senses along the line of contact.

14. The process of claim 1, wherein at least two liquids are deposited in succession on the surface of at least one of the filaments.

15. The process of claim 14, wherein a first liquid is deposited after transfer of the liquid from the mat to the roller.

16. The process of claim 1, wherein the liquid is supplied to the mat by a metering pump.

17. The process of claim 16, wherein the metering pump is a diaphragm pump or a peristaltic pump.

18. The process of claim 16, wherein a fluid circuit is formed between the pump and the mat, the fluid circuit comprising a flow meter and a computer for regulating flow of liquid from the pump to the mat.

19. The process of claim 1, wherein the liquid is supplied to the mat by delivering a pressurized gas upstream of a tank of said liquid.

20. The process of claim 19, wherein a fluid circuit is formed between the tank and the mat, the fluid circuit comprising a flow meter, a regulating valve, and a computer for regulating flow of liquid from the tank to the mat.

21. The process of claim 19, wherein a fluid circuit is formed between an inlet for supplying the pressurized gas and the tank, the fluid circuit comprising a temperature-compensating volumetric regulating valve.

22. The process of claim 1, wherein the mat is formed of a material selected from the group consisting of natural felts, synthetic felts, and woven fabrics.

23. The process of claim 22, wherein the mat consists essentially of fibers having diameters of less than about 20 $\mu$m.

24. The process of claim 1, wherein the mat is formed of a material selected from the group consisting of polypropylene, polyester, wool, and cellulose.

25. The process of claim 1, wherein the roller has surface micropores with dimensions less than about 10 $\mu$m.

26. The process of claim 25, wherein the surface of the roller is formed of a material selected from the group consisting of graphite or graphite derivatives.

27. The process of claim 1, wherein the liquid transferred to the roller forms a film on the surface of the roller with a thickness less than about 8 μm.

28. The process of claim 27, wherein the film has a thickness between about 3 μm and about 5 μm.

29. The process of claim 1, wherein the liquid is deposited onto the filaments in an amount not exceeding about 3% by weight with respect to the weight of the filaments.

30. The process of claim 1, wherein the liquid is deposited onto the filaments in an amount not exceeding about 1% by weight.

31. The process of claim 1, wherein at least two liquids are transferred onto the filaments in succession, with the liquids being capable of reacting with one another.

* * * * *